United States Patent

[11] 3,578,013

| [72] | Inventor | Guy Brochard |
| | | Asnieres, France |
| [21] | Appl. No. | 821,312 |
| [22] | Filed | May 2, 1969 |
| [45] | Patented | May 11, 1971 |
| [73] | Assignee | Societe Anonyme D.B.A. |
| [32] | Priority | May 8, 1968 |
| [33] | | France |
| [31] | | 150.983 |

[54] VORTICES, PARTICULARLY TO THEIR OUTLET
18 Claims, 8 Drawing Figs.

[52] U.S. Cl..................................................... 137/81.5
[51] Int. Cl..................................................... F15c 1/16,
F15c 3/06
[50] Field of Search........................................ 137/81.5;
73/194, (VOR.), (E.M.)

[56] References Cited
UNITED STATES PATENTS

| 1,628,723 | 5/1927 | Hall | 137/81.5X |
| 3,232,095 | 2/1966 | Symnoski et al. | 137/81.5X |
| 3,267,946 | 8/1966 | Adams et al. | 137/81.5 |
| 3,276,259 | 10/1966 | Bowles et al. | 137/81.5X |
| 3,417,772 | 12/1968 | Schaeffer | 137/81.5 |
| 3,444,878 | 5/1969 | Mayer | 137/81.5 |
| 3,461,896 | 8/1969 | Holloway | 137/81.5 |
| 3,468,327 | 9/1969 | Jones et al. | 137/81.5 |
| 3,493,003 | 2/1970 | Peoples | 137/81.5 |
| 3,500,853 | 3/1970 | Freeman | 137/81.5X |
| 3,504,688 | 4/1970 | Jones | 137/81.5 |

*Primary Examiner*—Samuel Scott
*Attorneys*—Robert A. Benziger and Plante, Arens, Hartz, Hix and Smith ABSTRACT: A fluid vortex includes: a cylindrical chamber; a first inlet for the main fluid into the chamber; a control inlet for the tangential introduction of a control fluid into the chamber in order to impart to the main fluid travelling inside the chamber a rotary motion; and an axial outlet for the fluid escaping from the chamber. According to the present invention, a body having substantially a revolution shape and without any rigid mechanical connection with the vortex is placed in the vortex outlet as a load therefor.

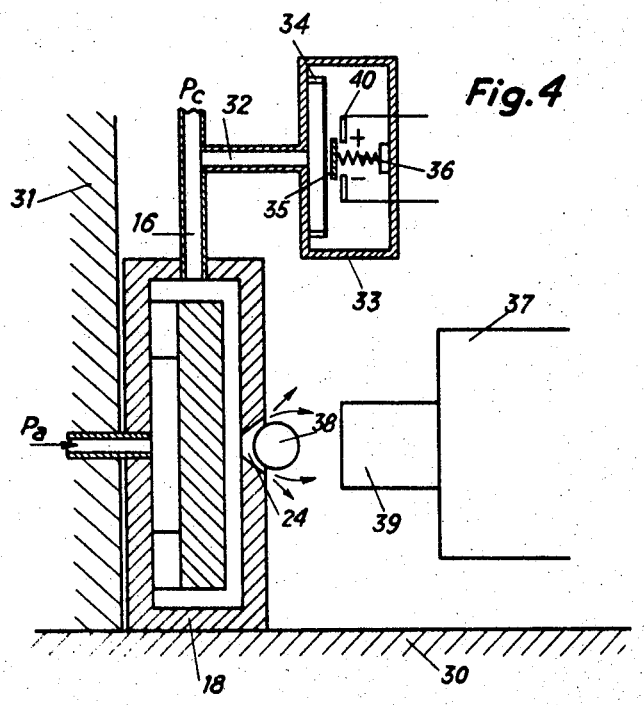
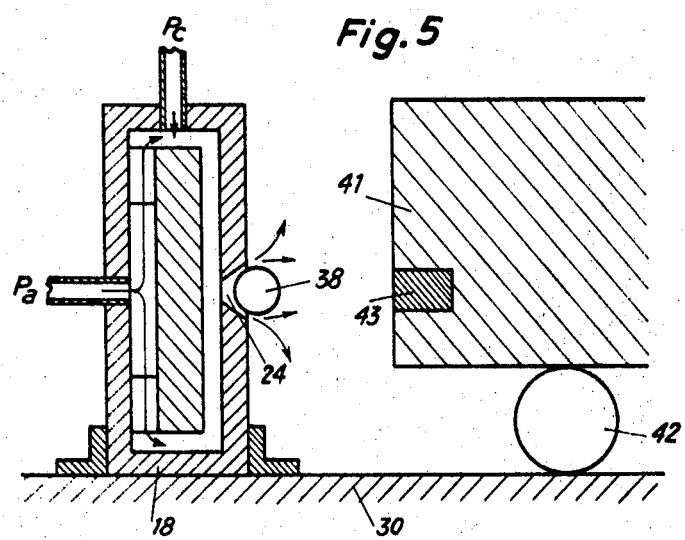

VORTICES, PARTICULARLY TO THEIR OUTLET

This invention relates to fluidic devices and, more particularly to fluid vortices and the output means therefor.

A fluid vortex includes: a cylindrical chamber; a first inlet for the main fluid into the chamber; a control inlet for the tangential introduction of a control fluid into the chamber in order to impart to the main fluid travelling inside the chamber a rotary motion; and an axial outlet for the fluid escaping from the chamber. When the flow of the control fluid is nil, the main fluid introduced into the chamber flows out through the outlet without any restriction. The introduction of the control fluid imparts to the main fluid inside the chamber a rotary motion which causes a reduction of the fluid flow through the outlet and which modifies the geometry of the flow.

According to the present invention a body having substantially a revolution shape and without any rigid mechanical connection with the vortex is placed in the vortex outlet as a load therefor.

Under certain operating conditions the interaction between the output flow and said body is such that the latter reaches a stable equilibrium position even in the presence of an exterior field such as the gravity field. Moreover said body may be rotated at high speed by the vortex flow.

According to a particularly simple embodiment, the vortex outlet is conical and the body is spherical.

More complex, substantially revolution shapes may be foreseen for the outlet as well as for the load body. The only condition is that both shapes in regard be sufficiently matched to create an important restriction in the fluid flow at the vortex outlet.

According to another embodiment of the present invention, either a cylinder ended by two hemispherical parts or a body having a dumbbell shape is located between the conical outlets of two vortices facing each other and rigidly fixed to one another.

Other characterizing features will appear from the following description with reference to the accompanying drawings in which:

FIG. 4 is a sectional and side view of a detector of end of stroke according to the invention;

FIG. 5 is a sectional and side view of a proximity detector according to the invention;

None of the FIGS. show the detail of the inside of the vortex since this does not form part of this invention, the latter being applicable to any kind of vortex.

Figure 1:
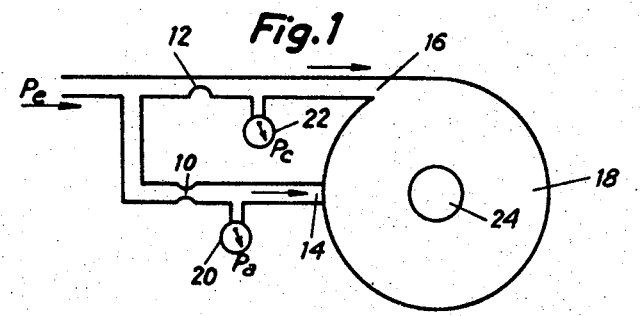
FIG. 1 is a conventional and diagrammatic representation of a vortex.

FIG. 1 recalls that a vortex is supplied from a common fluid supply source under a pressure $P_e$ through two restrictions 10 and 12 leading respectively to a main inlet 14 and to a control inlet 16. As viewed in FIGS. 1 and 2, the vortex has the general shape of a flat and hollow cylinder. The main inlet 14 is provided at the center of one of the flat faces whilst the control inlet 16 is made through the lateral wall of the cylinder so as to open tangentially into the cylinder. An intermediary disc 17 forces the main flow of fluid coming from the inlet 14 to flow according to cylindrical layer. Manometers 20 and 22 located respectively in the conduits connecting the supply source to the main input 14 and to the control input 16 respectively measure existing pressures $P_a$ and $P_c$ respectively.

The vortex has also an outlet 24 axially located in the second flat face of the cylinder 18.

Input pressures are respectively $P_a$ and $P_c$ and depend very narrowly on the variations of the output configuration.

According to the invention the axial outlet 24 has a conical shape and this outlet is loaded by a ball 38.

Experience shows without the inventor being at present able to theoretically explain the observed phenomena, this absence of theoretical explanation not being prejudiciable to or not restricting in any way the merit of the invention, that for given values of pressures of supply ($P_a$) and of control ($P_c$) the fluidic flow at the outlet 24 is such that the ball 38 located on the conical seat made by the fluidic flow remains in a stable position. Moreover this ball is driven in rotation at a rotary speed which may be estimated equal to many thousands revolutions per minute (r.p.m.), in normal conditions of experience.

Contrarily to what could be assumed the ball is not expelled away from the outlet 24 by the whirling fluid flow but for an appropriate adjustment of the whirling in the fluid system the ball is maintained in a stable position on the conical seat made by the fluidic flow as if the ball were resting on the seat while rotating at a high speed about its axis. There resides a highly surprising effect therein.

However experience shows that if only a single fluid flow corresponding to either of pressures $P_a$ or $P_c$ is introduced into the vortex, the ball 38 is unable to reach a stable position and is finally expelled. It is necessary that the vortex operates normally and it is probably necessary that there exists already a certain coefficient of closure.

Gravity which exists at the place of experience has obviously an influence on the behavior of the ball. Experience shows that the axis of rotation of the ball coincides with the axis of the conical outlet 24 when the latter is in coincidence with the local gravity vector. In this last hypothesis, the vortex of FIGS. 1 and 2 being supposed placed in an horizontal plane with the ball 38 above it, experience shows that if the device is rotated by an angle of 180° about an horizontal axis in such a way that the vortex be again in an horizontal plane but the ball be then below it, the ball does not fall under the action of its weight but remains on its seat.

Figure 2:
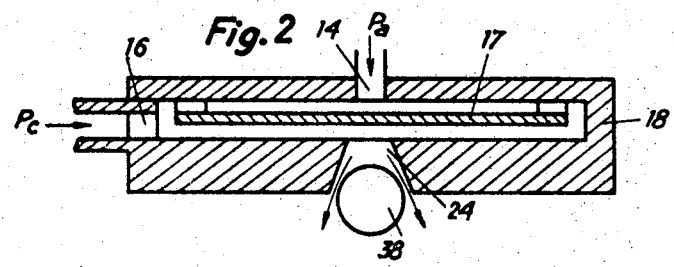
FIG. 2 is a sectional and side view of a first embodiment according to the invention.
Figure 3:
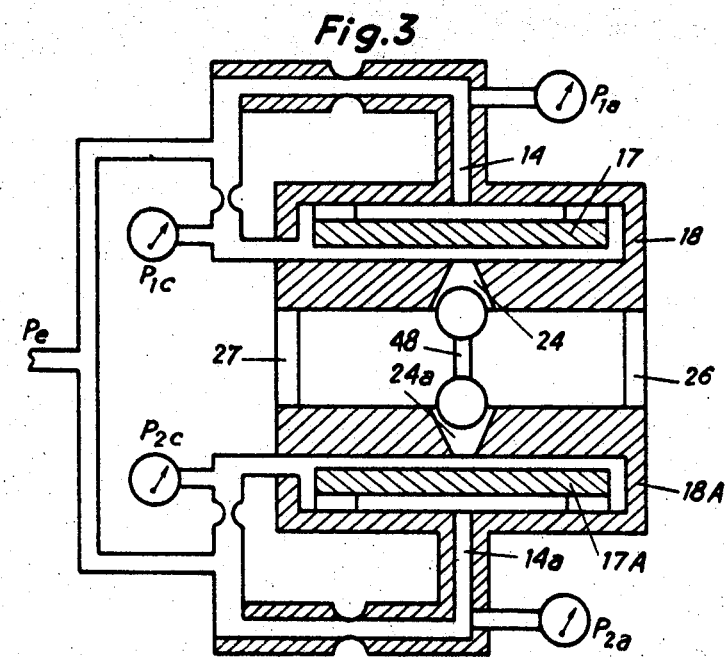
FIG. 3 is a sectional and side view of a second embodiment according to the invention.

In FIG. 3 in which elements identical to those of FIGS. 1 and 2 are designated by the same reference numerals, a vortex 18 similar to the one of FIGS. 1 and 2 except in that the body loading the outlet 24, has been represented at the top of the FIG. A second vortex 18A, similar to vortex 18 has been represented at the bottom of the FIG. and both vortices are disposed in such a way that their outlets 24 and 24A are facing each other. Both vortices are rigidly fixed to one another through connecting members 26 and 27.

According to the invention outlets 24 and 24A of both vortices are loaded by a same body 48 having for example the shape of a dumbbell ended by two hemispherical parts the distance between which may be adjusted by any conventional mechanical means such as a thread connection. The two hemispherical parts enter respectively the conical outlets of vortices. If the vortices operate in such a way that the rotation vectors $\Omega_1$ and $\Omega_2$ of fluid flows in the respective outlets 24 and 24A are in the same direction, the loading body 48 rotates about the axis of symmetry of the assembly passing by supply inlets 14 and 14A and has simultaneously an important rotary speed of the order of many thousands r.p.m. imparted thereto. Such a differential setting permits between other advantages to avoid variations of supply pressure $P_3$.

The applications of the present invention may be divided into two classes according to whether the possibilities of suspension and rotation of the body are used either separately or in conjunction with pressure variations of $P_a$ and $P_c$.

In the first class are to be found all applications requesting the provision of fluidic bearing with or without rotation. The selected configuration is generally the one of FIG. 3, wherein the rotation fields of both vortices are either in the same sense or in opposite senses according to whether the driving in rotation of the body is desired or not.

In the second class are to be found the applications in which the suspended body is submitted to a mechanical displacement by an outside structure and the applications in which the suspended body is submitted to a field of force. In both cases variations of $P_a$ and $P_c$ are used, possibly after fluidic amplification to provide a measure indication or an information in a regulation system. The differential configuration of FIG. 3 in which it is possible to use pressure differentials ($P_{1a}-P_{2a}$) and ($P_{1c}-P_c$) permits to eliminate the first order variations in the supply pressure $P_e$. As a nonrestrictive example it may be indicated a displacement pickoff sensor and an accelerometer.

The main interest of the use as a displacement pickoff sensor resides in the high sensitivity of the system. Moreover the system does not suffer dry friction, hysteresis and simplifies centering problems. As an example the sensitivity is such that for a supply pressure $P_e$ of two bars, a displacement of the suspended body of one one-thousandth mm. along the symmetry axis of the system results in a pressure variation of 80 millibars of $P_a$ or $P_c$. On the other hand the response is substantially linear in a range of twenty one-thousandths mm. This characteristic is of great interest in the control of a machine-tool utilizing a fluidic logic.

The main interest of use as accelerometer is the high simplicity resulting in a very low manufacturing cost. Moreover the absence of dry friction and of hysteresis results in interesting performances and excellent fiability. Sensitivity and time of response characteristics are adjusted for each particular application by selection of supply pressure $P_e$, capacity of the vortex and mass of the suspended body.

According to the embodiment of FIG. 4, a vortex 18 identical to that of FIGS. 1 and 2 is rigidly fixed to an horizontal frame 30 and to a vertical frame 31. On the supply conduit 16 of control fluid at pressure $P_c$ is connected a conduit 32 closed at its opposite end by a box 33 including a flexible diaphragm 34 against which bears the movable arm 35 of an electric relay 40. The movable arm 35 is maintained against the diaphragm 34 by a spring 36 supported at one end thereof by one of the faces of the box 33. This apparatus may be used to detect with high precision—of the order of one one-thousandth mm.—the end of stroke of the tool 37 of a machine-tool including an abutment 39. When the tool abutment 39 engages the ball 38 of the vortex 18 and urges the latter towards the conical outlet 24, control pressure $P_c$ increases. The movable arm 35 is repelled by diaphragm 34 against the action of spring 36. Electric relay 40 is closed and enables transmittal of a control data such as the change of workpiece or a modification of the work of the tool.

According to the embodiment of FIG. 5, a vortex 18, identical to that of FIGS. 1 and 2, is rigidly secured to an horizontal frame 30. A movable frame 41, which may be moved thanks to a roller 42 parallel to the fixed frame 30, carries a magnet 43 fixed therein. When the movable frame 41 is sufficiently near the vortex, the magnet 43 acts upon the ball 38 and modifies the position thereof. This results in pressure variations of $P_a$ and $P_c$. Thanks to variations of one of said pressures, proximity of frame 41 may be easily detected with a high precision. The same device may still be used to calibrate magnetization of successive magnets 43 by comparison of their action on the ball 38 with that of a formerly calibrated magnet.

Figure 6:
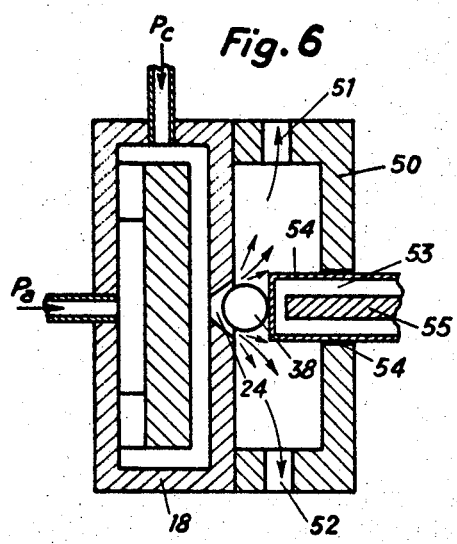
FIG. 6 is a sectional and side view of a temperature pickoff device according to the invention.

According to the embodiment of FIG. 6, which includes a vortex 18 identical to the one of FIGS. 1 and 2, the ball 38 and the conical outlet 24 are located inside a cover 50 in the lateral faces of which orifices 51 and 52 have been drilled to permit fluid flow and in the bottom of which an orifice 53 has been provided to receive a hollow cylinder 54—55. The fluid is circulated in said hollow cylinder 54—55 which abuts ball 38 and the temperature of the fluid or the variation in temperature as a function of time may be measured since they will cause the expansion of the cylinder and thus of the ball 38 with respect to its seat.

The outer wall 54 of this hollow cylinder is made of a substance having a high expansion coefficient whilst the ball 38 is made of a substance having a very small expansion coefficient. The outer wall 54 is in abutment against the ball 38 without being solid therewith. Variations of expansion of the outer wall 54 caused by temperature variations of the fluid flowing through the hollow cylinder 54—55 result in a displacement of the ball 38 which results in pressure variations of $P_a$ and $P_c$. This apparatus is very sensitive and it is very easy to deduce temperature variations of fluid flow from pressure variations of $P_a$ or $P_c$.

Figure 7:
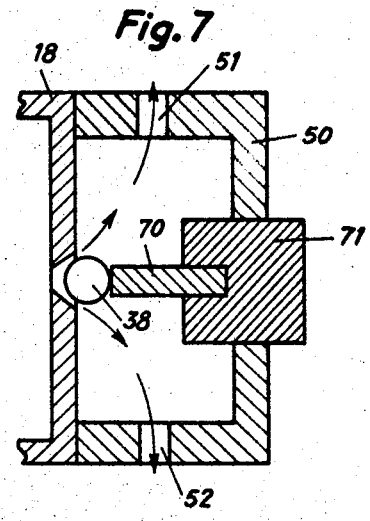
FIG. 7 is a sectional and side view of another embodiment of a temperature pickoff sensor device according to the invention.

A modification of the embodiment of FIG. 6 is illustrated in FIG. 7. According to this embodiment the hollow cylinder 54—55 has been changed to a solid rod 70 made of a material having a high linear expansion coefficient one end of which is fitted on a support frame 71 having a small expansion coefficient bound to the vortex 18 through the cover 50. The other end of rod 70 engages the ball 38 without being solid therewith. Such a device enables measuring either ambient temperature variations, for example the exposure of the assembly to the sun rays, or temperature of the fluid flowing through vortex 18, for example the temperature of the gas of jet engines. According to another alternative the expansion body may be the ball 38 proper which can be hollow and made of a substance having a high coefficient of expansion. In this last hypothesis the rod which abuts this ball has a very small coefficient of expansion.

Figure 8:
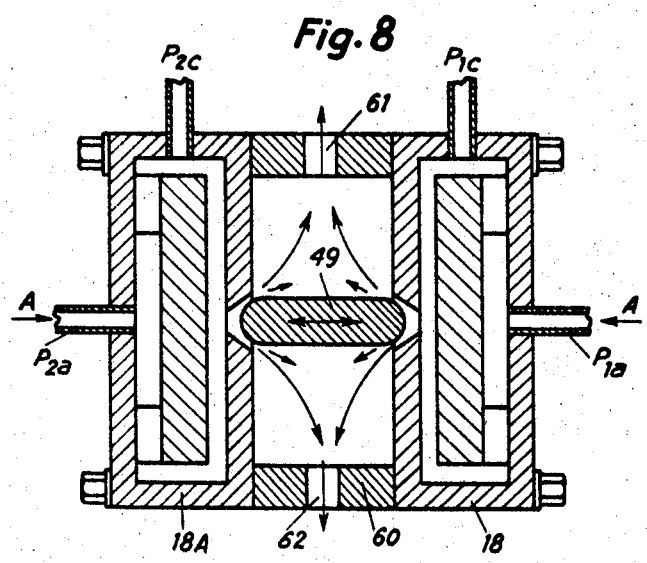
FIG. 8 is a sectional and side view of an accelerometer according to the invention.

The embodiment of FIG. 8 is identical to that of FIG. 3 with the exception that the whole assembly has been rotated by 90° and a cylinder 49 ended by two hemispheres has been substituted for the dumbbell. An enclosure between both vortices 18 and 18A consists of a junction cylinder 60, orifices 61 and 62 have been provided in said cylinder to permit flow of the fluid from the two vortices 18 and 18A. If the assembly is submitted to a longitudinal acceleration along the axis AA, this movement results in a displacement of the cylinder 49 along the same axis and an information $P_{2c}-P_{1c}$ may be picked up from which may be deduced the acceleration to which the measuring apparatus is submitted.

If on the other hand the measuring apparatus of FIG. 8 is rotated in a plane forming any angle differing from zero with rotation axis of the cylinder 49, a reaction on the bearings may be observed which may be detected and measured thanks to pressure variations. Assuming that cylindrical body 49 rotates around axis AA, a gyroscope has been obtained which may be used in any manner known by the man having ordinary skill in the art, in particular as a rate gyro.

I claim:

1. A fluidic device comprising a cylindrical chamber; a first inlet for a main fluid flow into said chamber; a control inlet for the tangential introduction of a control fluid into said chamber in order to impart to the main fluid flow circulating in said chamber a rotational velocity; an axial outlet means having wall means presenting a shape substantially of revolution and a body means having also a shape substantially of revolution which is placed in said outlet means as a load for said fluidic device without any rigid mechanical connection with said device; said body being such that it prohibits the existence of any axial flow between said wall means and said body.

2. A fluidic device according to claim 1 wherein said outlet means is or are conical in shape.

3. A fluidic device according to claim 1, wherein said loading body means is hollow.

4. A fluidic device according to claim 1 wherein said loading body means is made of a material having a small expansion coefficient.

5. A fluidic device according to claim 1 wherein said loading body means is made of a material having a high expansion coefficient.

6. A fluidic device according to claim 1 which includes a common fluid supply source of pressure connected to said main inlet and to said control inlet respectively through supply conduits each comprising a restriction and a pressure measuring apparatus so that variation of the position of said loading body means with respect to said outlet means may be appreciated by variation of the indication of said pressure measuring apparatus.

7. A fluidic device according to claim 1 wherein an electrical relay including a flexible diaphragm means is connected on a supply conduit for said control fluid flow and the abutting portion of the tool of a machine-tool is placed in the vicinity of said body means so that abutment of said abutting portion against said body means increases control pressure in said control fluid supply means and causes switching action of said electrical relay.

8. A fluidic device according to claim 1 wherein a movable frame is placed in the vicinity of said body means, said movable frame having fitted therein a removable magnet so that magnetization of successive magnets may be calibrated by comparison of their respective action on said body means.

9. A fluidic device according to claim 1, wherein the outer face of said fluidic device including said axial outlet means supports a cover through which passes a hollow and folded cylinder engaging said body means so that a fluid flowing through said folded cylinder causes an expansion of the wall of said cylinder engaging said body means whereby either the present temperature of said fluid flowing through said folded cylinder or temperature variations as a function of time may be measured by pressure variations in supply conduits inherent in variations of position of said body means under expanding action of the wall of said cylinder.

10. A fluidic device according to claim 1, wherein the outer face of said fluidic device including said axial outlet means supports a cover through which passes a support frame having fitted therein a rod engaging said body means by its free end, either one of said rod and of said body means being made of a material having a small expansion coefficient whilst the other one is made of a material having a high expansion coefficient so that temperature variations may be measured by expansion of either one of said rod and of said body means.

11. A fluidic device according to claim 1 wherein said loading body means has an hemispherical end portion.

12. A fluidic device according to claim 11, wherein said loading body means is a ball.

13. A fluidic device according to claim 11, wherein said loading body means is a cylinder having at least an hemispherical end portion.

14. A fluidic device comprising two identical structures, each of said structures including: a cylindrical chamber; a first inlet for a main fluid flow into said chamber; a control inlet for the tangential introduction of a control fluid into said chamber in order to impart the main fluid flow travelling inside said chamber a rotational velocity; an axial outlet means for the fluid flowing outside said chamber, said axial outlet means having a shape substantially of revolution, said two identical structures being located in registration so that their outlet means face each other, and a body means having also a shape substantially of revolution, which is placed simultaneously in the outlet means of both of said structures as a load therefor without any rigid mechanical connection with any of said structures.

15. A fluidic device according to claim 14, wherein said two identical structures are rigidly fixed together and rigidly fixed to a movable supporting frame in such a way that the symmetry axis of said body means is substantially parallel to said movable supporting frame whereby the modification of the position of said body means with respect to said two identical structures permits to measure, inter alia, acceleration imparted to said fluidic device through reading of pressure variations through said supply conduits.

16. A fluidic device according to claim 14, wherein said loading body means is ended at two opposite extremities by hemispheral end portions.

17. A fluidic device according to claim 16, wherein said loading body means is a cylinder having an adjustable axial length.

18. A fluidic device according to claim 16, wherein said loading body means is a dumbbell having an adjustable axial length.